United States Patent Office 3,424,370
Patented Jan. 28, 1969

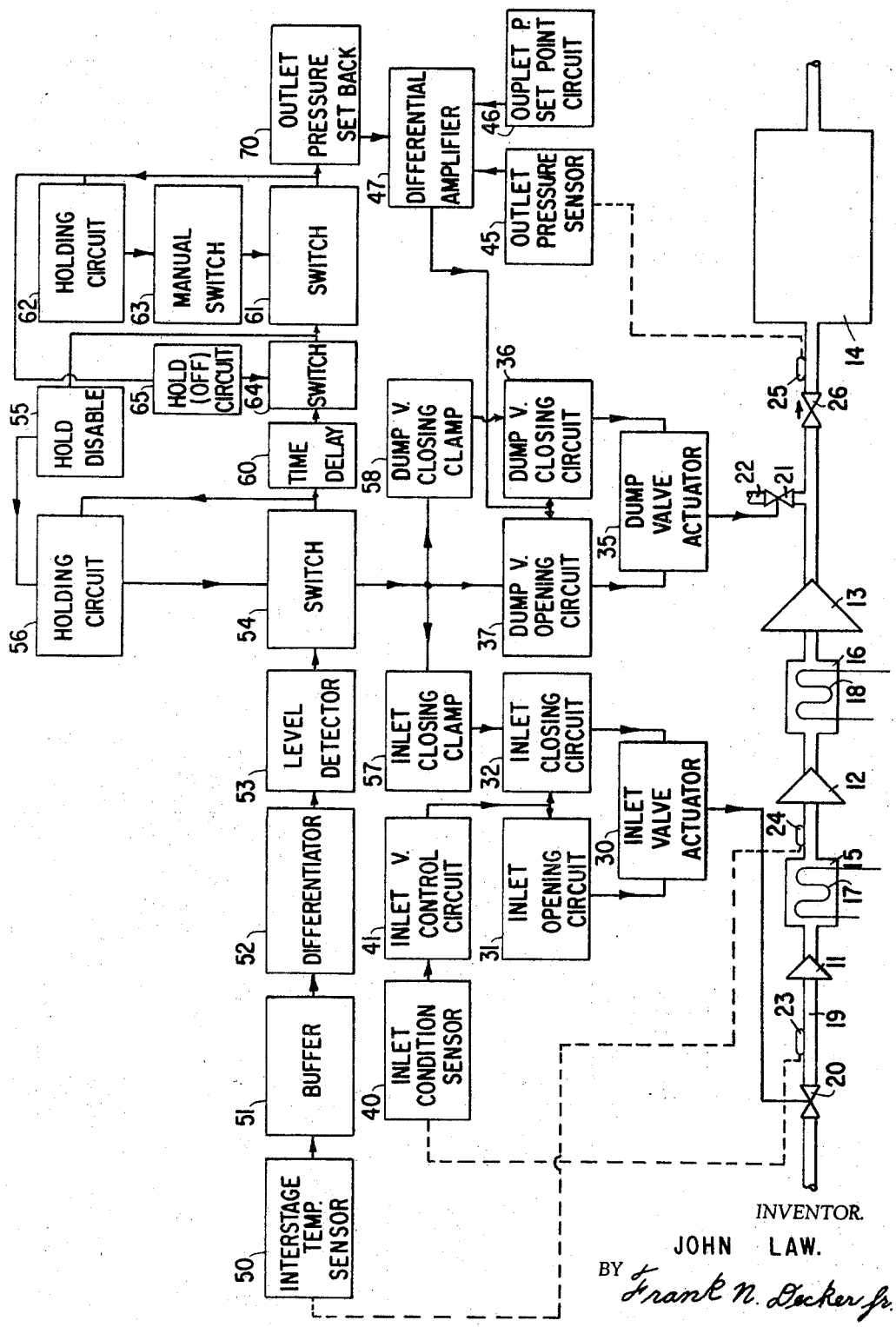

3,424,370
GAS COMPRESSION SYSTEMS
John Law, Manlius, N.Y., assignor to Carrier Corporation, Syracuse, N.Y., a corporation of Delaware
Filed Mar. 13, 1967, Ser. No. 622,544
U.S. Cl. 230—5          18 Claims
Int. Cl. F04b 49/02, 41/06

ABSTRACT OF THE DISCLOSURE

A gas compression system having control means for detecting the onset of a surge condition and for adjusting the conditions of operation of the system to eliminate the surge condition and lessen the likelihood of its reoccurrence. The control system is responsive to the rate of change of inlet gas temperature to one of the stages of a centrifugal compressor. When a rate of change of temperature is detected, which is indicative of the onset of a surge condition, inlet and discharge valves in the system are repositioned and the discharge pressure is reset downwardly to remove the surge condition and lessen the likelihood of its reoccurrence. If a surge condition is subsequently detected, the discharge valve is fully opened to positively prevent damage to the system.

BACKGROUND OF THE INVENTION

This application relates to gas compression systems, and more particularly to the control of surge in a gas compression system of the type which employs a centrifugal gas compressor. This invention will be described with reference to a gas compression system which supplies service air for the operation of various pneumatic equipment such as pneumatic drills and air hammers.

It is well known that gas compression systems employing a centrifugal compressor are subject to a phenomenon known as "surge" at certain conditions of operation related to the pressure difference across the compressor and the mass flow through the compressor. Surge is a highly undesirable condition wherein the compressor becomes unstable and fails to provide compressed gas. Also, the compressor may be destroyed if the surge condition is allowed to continue.

Various systems have been devised to detect the occurrence of surge and to correct the operation of the system or to shut down the system to prevent damage to the compressor upon the occurrence of a surge condition. Arrangements are known which detect inlet temperature or outlet pressure or temperature or pressure differences between inlet and outlet of the compressor for shutting down the gas compression system at some predetermined magnitude which is assumed to bear some relation to the presence of a surge condition. Such arangements are not, however, altogether satisfactory, particularly in systems of the type described where the temperature of the air admitted to the compressor may vary over a wide range.

SUMMARY OF THE INVENTION

In accordance with a preferred embodiment of this invention, a gas compression system employing a centrifugal compressor and having an inlet gas throttling valve and a dump valve for discharge gas is provided with a main control system to maintain the discharge gas pressure relatively constant over a range of anticipated inlet gas temperature and pressure conditions. Normally, the main control for the gas compression system compensates for variations in inlet gas conditions and helps to maintain the output pressure uniform.

In addition, a surge control is provided having a temperature sensor responsive to inlet gas temperature at the inlet to a stage of the compressor. A temperature signal is provided by the sensor which is a function of the sensed inlet gas temperature. The temperature signal is differentiated to obtain a first derivative or differentiated temperature signal having a level which is proportional to the rise rate of sensed inlet temperature and is independent of absolute temperature. The differentiated temperature signal is then passed to a level detector to detect the occurrence of a level which is indicative of the onset of a surge condition. The level detector transmits a surge control signal to override the main control and adjust the conditions of operation of the system in a direction to lessen the tendency for surge to reoccur.

In the system described, the occurrence of a surge control signal prevents the inlet valve and the dump valve from closing further and causes the dump valve to open for a sufficient period of time to allow the system to stabilize and recover from the surge condition. Sometime after the presence of the surge control signal, the discharge gas set point pressure of the main control is automatically reset to a lower value than originally selected and the inlet and dump valves are restored to operate in response to the main control. The resetting of the discharge gas pressure set point reduces the tendency for surge to reoccur in the system. However, in the event that a second surge condition is sensed by an excessive rise rate of the inlet temperature, a second surge control signal opens and holds open the dump valve to eliminate the possibility of surge reoccurring until the system is manually restored to operation thereby preventing damage to the compressor.

BRIEF DESCRIPTION OF THE DRAWING

The figure is a schematic flow diagram of a gas compression system embodying the improved surge control features of this invention.

DESCRIPTION OF THE PREFERRED EMBODIMENT

The blocks illustrated in the drawing represent functions which may be readily provided in a control system by use of well-known control components. In generally describing these controls, reference will be made to a typical solid state electronic control system employing well-known circuitry. It will be apparent that other types of known controls such as hydraulic, pneumatic, or fluid amplifier controls having the described functions may be substituted for any or all of the described functions.

The drawing illustrates a multistage centrifugal gas compressor 10 having a first stage 11, a second stage 12 and a third stage 13 connected in series and discharging into receiver 14. An interstage cooler 15 is disposed between first stage 11 and second stage 12 and another interstage cooler 16 is disposed between second stage 12 and third stage 13 of the compressor. Interstage cooler 15 has a heat exchange coil 17 and interstage cooler 16 has a heat exchange coil 18 disposed therein for passing a cooling medium in heat exchange relation with the gas flowing between the stages of compressor 10.

Ambient air passes to the inlet of first stage 11 of compressor 10 through inlet gas line 19 and modulating inlet gas valve 20. A check valve 26 is provided in the line between the discharge of third stage 13 of compressor 10 and receiver 14. Bypass line 22 is connected between compressor 10 and receiver 14 and is provided with a modulating dump valve 21 for discharging compressed gas to the atmosphere or other suitable location to satisfy the pressure and volume demands of the gas compression system. A suitable location 23 is provided for suitable inlet gas condition sensors, a location 24 is provided adjacent the inlet of second stage 12 for an interstage temperature sensor and a location 25 is provided for an outlet gas pressure sensor.

A main control system is provided for maintaining a substantially uniform gas discharge pressure in receiver 14 irrespective of variations in air temperature and pressure admitted to compressor 10. The main control system comprises inlet condition sensors 40 for sensing the temperature and pressure of inlet air and providing an inlet air density control signal which is a combined function of the temperature and pressure of the inlet air. Inlet condition sensors 40 may comprise pressure and temperature transducers in the electronic system to be described; however, pneumatic transducers or other equivalent sensors may be employed in conjunction with a pneumatic or fluid amplifier type of control system.

The inlet air density signal is passed from condition sensors 40 to a main inlet valve control circuit 41. Main inlet valve control circuit 41 may include an electronic differential amplifier providing an inlet valve opening or closing signal to inlet valve opening circuit 31 and inlet valve closing circuit 32. The inlet valve opening and closing circuits may each comprise a Triac switching device to supply power to inlet valve actuator 30 in such manner to appropriately produce either the opening or closing function of the valve. Inlet valve actuator 30 may include a permanent split capacitor motor mechanically connected to position modulating inlet valve 20. The motor may have a pair of windings bridged by a capacitor such that when current is supplied directly to one winding and through the capacitor to the other winding, the motor runs in a valve opening direction and vice versa. Hydraulic or pneumatic motors may be employed instead of an electrical motor, if desired.

The other part of the main control circuit of the gas compression system comprises an outlet pressure sensor 45 disposed to sense the discharge pressure of the gas compression system. Outlet pressure sensor 45 provides an outlet pressure signal to a differential amplifier 47. A suitable outlet pressure set point circuit 46 is provided to generate an outlet set point signal which is provided to differential amplifier 47 to provide the desired outlet pressure in receiver 14. Differential amplifier 47 provides an error signal to a dump valve opening circuit 36 and a dump valve closing circuit 37 in the event that the sensed pressure differs from the desired set point pressure. The dump valve opening and closing circuits 36 and 37 may be of the same type previously described with respect to the inlet valve opening and closing circuits 31 and 32. The dump valve opening and closing circuits provide a suitable dump valve opening and closing signal to dump valve actuator 35 which may be similar to inlet valve controller 30 and which is mechanically connected to position dump valve 21. When the dump valve controller 35 moves in an opening direction, air is bypassed from compressor 10 through bypass line 22 and discharged to the atmosphere or other suitable location and when the dump valve is moved to a more closed position, a greater quantity of air is discharged into receiver 14 and a lesser quantity of air is bypassed. Alternately, the dump valve may be operated only in a full open or full closed position instead of being modulated, if desired.

The operation of the main controller is such as to maintain a substantially uniform compressed air discharge pressure in a receiver 14 for distribution to required locations over a range of conditions of inlet air temperature and pressure. For example, if the temperature of the inlet air sensed at location 23 rises or its pressure decreases, the inlet condition sensors will respond to provide an inlet density signal corresponding to the lessened density of the inlet air and cause the inlet valve controller to move in a more open direction to admit a greater volume of the less dense air to compressor 10. The inlet valve controller in conjunction with the modulating dump valve acts to avoid compresser surge over a range of operating conditions. During periods of heavy system air demand on receiver 14, outlet pressure sensor 45 at location 25 will sense the decreasing receiver air pressure and send a corresponding outlet pressure signal to differential amplifier 47 which in turn will provide a control signal to close dump valve 21 so that sufficient make-up air from compressor 10 is provided into receiver 14 to maintain a substantially constant receiver air pressure. It will be apparent that under conditions of increased air density or lessened system air demand, the respective reverse functions will take place to maintain the system in proper operation at a mass flow rate designed to provide optimum system performance.

The set points of the main control system are designed with respect to the compressor capacity to normally avoid the occurrence of a surge condition in the system. However, in accordance with this invetnion, an additional surge control system is provided which overrides the main control system upon the occurrence of a surge due to abnormal operating conditions.

The surge control system comprises an interstage inlet gas temperature sensor 50 which is preferably a negative temperature coefficient thermistor. While sensor 50 can be located at the inlet of any one or each of the stages of compresseor 10, it has been found preferable to locate it between interstage cooler 15 and the inlet of second stage 12 of compressor 10 where the compressor is of the three-stage type so that the sensor responds to inlet air temperature at the inlet of the second stage. The temperature control signal is passed to a buffer stage 51 which in the preferred embodiment may be a transistor stage which presents a high impedance to the temperature sensor, thereby preventing loading of the sensor and isolating the remaining control circuits from interacting on the interstage temperature sensor.

The buffer stage 51 provides an output signal current which is a function of the inlet air temperature sensed by interstage thermistor 50 and this signal is provided to a differentiator circuit 52. Differentiator circuit 52 may comprise a capacitor and resistor which provides a signal corresponding to the first derivative of the sensed interstage temperature.

It has been found that the differentiated temperature signal is an accurate indication of the onset of a surge condition in a centrifugal compressor. By this it is meant that the surge condition is detected almost immediately after it begins. The differentiated temperature signal has a level which corresponds to the rise rate of the sensed inlet temperature and is relatively independent of the absolute temperature. Consequently, the surge control circuit does not provide an erroneous indication of surge when the inlet temperature rises due to changes in cooling water temperature, ambient inlet temperature or air system load changes. Similarly, variations in density and flow rate of the sensed air also do not erroneously affect the operation of the surge control when a differentiated temperature signal is employed to initiate the surge control functions.

The differential temperature signal is passed from differentiator 52 to a level detector 53. Level detector 53 detects the existence of a differentiated temperature signal level equal or greater than that level which corresponds to a temperature rise rate indicative of the onset existence of a surge condition in the compressor. Level detector 53 preferably comprises a Schmitt trigger which provides a surge control output signal in the event that the input signal from differentiator 52 exceeds the predetermined surge level.

Switch 54 is turned on to a conducting state by the presence of a surge control signal from level detector 53 and provides an output to a holding circuit 56. The output signal from holding circuit 56 is returned to switch 54 to hold switch 54 closed. Holding circuit 56 may comprise a diode rectifier which provides a relatively positive voltage from the cathode circuit to the gate of a silicon-controlled rectifier of switch 54 to hold it in a conducting state.

When switch 54 is turned on by a surge control signal, a signal is passed to an inlet closing clamp 57 which in turn passes a clamping signal to the inlet closing circuit 32 of inlet valve controller 30. The presence of a clamping signal to inlet valve controller 30 prevents the inlet valve from further closing which would tend to aggravate the surge condition. The inlet closing clamp may comprise a transistor which is turned on by the presence of the surge control signal so as to ground the gate of the Triac which controls passage of an inlet valve opening current making it impossible to turn the Triac on.

When switch 54 is turned on by a surge control signal, a signal is also passed to dump valve closing circuit clamp 58 which passes a clamping signal to dump valve closing circuit 37 and performs a similar function to that described with respect to the inlet valve closing clamp so as to prevent the dump valve from further closing, which would aggravate the surge condition. Dump valve closing clamp circuit 58 may also comprise a circuit similar to that described with respect to inlet closing clamp circuit 57.

Further, when a surge control signal turns on switch 54, a signal is passed to dump valve opening circuit 36 which in turn passes a signal to dump valve control 35 to fully open dump valve 21 for as long as the signal is present. Opening dump valve 21 decreases the pressure ratio across compressor 10 and increases the flow through the compressor which allows operation of the compressor in the stable or nonsurge region.

In addition, switch 54, which is still held on by holding circuit 56, provides a surge control signal to time delay circuit 60. Time delay circuit 60 preferably comprises a resistance capacitor network having the desired time constant for charging of the capacitor. Consequently, the surge control signal will appear as an output from time delay network 60 a predetermined length of time after the occurrence of the surge control signal at the input.

The surge control signal output of time delay network 60 passes to switch 64. Switch 64 passes a signal to the hold disabling circuit 55 which disables holding circuit 56, thus permitting switch 54 to turn off. Switch 64 may comprise a unijunction transistor which disables holding circuit 56 by grounding the gate of the silicon-controlled rectifier switch. Alternately, time delay circuit 60 may be omitted and switch 64 may be actuated by a signal from dump valve 21 when it has reached its fully open position due to the surge signal from switch 54.

In addition, the surge control signal output of switch 64 turns on switch 61 which may comprise a silicon-controlled rectifier. The surge control signal output of switch 61 is supplied to holding circuit 62 and the output of holding circuit 62 is supplied through a normally closed manual switch 63 to hold switch 61 on in a conducting state. Holding circuit 62 may comprise a diode rectifier in series with a source of positive direct current which serves to maintain a positive charge on the anode of the silicon-controlled rectifier in switch 61 to maintain it in its on condition once it becomes conducting. In addition, switch 61 provides a signal to holding circuit 65 which holds switch 64 in its off condition such as by providing a path from its emitter to ground. It will be observed that since switch 64 is now held in its off position, and consequently a subsequent surge control signal output from time delay network 60 will not provide a signal to hold disabling circuit 55 to turn switch 54 off.

A surge control output signal from switch 61 also passes to outlet pressure set back circuit 70. Outlet pressure set back circuit 70 in turn provides a surge control signal to differential amplifier 47 which has the effect of reducing the predetermined set point pressure of the gas compression system somewhat below that which had previously been set by outlet pressure set point circuit 46. Preferably, outlet pressure set back circuit 70 may comprise a transistor stage which changes the current supplied to the differential amplifier in a manner so that a new set point current is established against which the signal from outlet pressure sensor 45 is compared to provide the control signal output from the differential amplifier to the dump valve control circuits.

At this point, it will be seen that a surge condition having been detected in the gas compression system, the surge condition has been eliminated by opening of dump valve 21, the set point pressure of the system has been reduced, and control of dump valve 21 has been restored to the main control system by opening of switch 54 a predetermined period of time after the occurrence of the surge condition. It is preferable to also provide the operator with a visual or other audible indication such as a pilot light that a surge has occurred in the system and that it is now operating at a lower set point pressure than that initially determined. However, the gas compression system is still fully operative at its lower set point pressure and it is unnecessary for the operator to give it immediate attention. When the operator so desires, he may restore the initial mode of operation to the system by momentarily opening manual switch 63 which disables holding circuit 62 from maintaining switch 61 on and therefore removes the surge control signal from outlet pressure set back circuit 70, and at the same time removes the held-off condition of switch 64.

Assuming that the operator does not open manual switch 63 and a second surge occurs in the system, a new function occurs because switch 64 is held off by holding circuit 65. When the second surge occurs, a surge control signal is supplied from level detector 53 to switch 54 in accordance with the previously described operation. The surge control signal initiates the inlet and outlet closing circuit clamp functions and opens dump valve 21 as previously described. Also, as previously described, a signal actuates holding circuit 56 which holds switch 54 in an on condition. However, since switch 64 is now held off by holding circuit 65, the presence of a surge control output from time delay circuit 60 cannot pass a signal to disabling circuit 55. Consequently, holding circuit 56 continues to hold switch 54 in its on condition until manual switch 63 is opened by the operator of the system. Since switch 54 is held on, dump valve 21 will be held completely open thereby preventing damage to the compressor.

The functions of the system described are preferably achieved with well-known solid state electronic circuits of which it is within the skill of the art to provide. Accordingly, the preferred embodiment of this invention has been discussed by way of example as employing an electronic circuit. It will be seen, however, that each of the functions can also be easily provided by pneumatic or fluidic relays, switches, transducers, and motors to provide a similar result. For example, a differential pressure assembly can be provided which provides the derivative of a function of sensed interstage inlet temperature from a pneumatic transducer to provide a pneumatic control signal to various pneumatic relays and pneumatic motors to initiate the surge control functions described in accordance with the temperature rise rate of the interstage inlet temperature.

I claim:
1. A method of controlling surge in a gas compression system having a gas compressor, which comprises the steps of sensing a condition of inlet gas admitted to a portion of said compressor; providing a gas condition signal which is a function of the sensed inlet gas condition, differentiating said gas condition signal to obtain a differentiated gas condition signal having a magnitude which is a function of the rate of change in said sensed gas condition; detecting the presence of a differentiated gas condition signal having an instantaneous magnitude greater than a predetermined magnitude indicative of the presence of a surge condition of said compressor; providing a surge control signal upon detection of the presence of a differentiated gas condition signal greater than said predetermined magnitude which is indicative of a surge con- dition in said compressor; and adjusting the condition of operation of said system in response to the occurrence of said surge control signal in a manner to reduce the tendency for surge to reoccur in said system.

2. A method of controlling surge in a gas compression system as defined in claim 1 wherein the temperature of inlet gas admitted to a portion of said compressor is sensed to provide said gas condition signal.

3. A method of controlling surge in a gas compression system as defined in claim 1 wherein said gas compressor comprises a multistage compressor and wherein the step of sensing inlet gas condition comprises sensing changes in the temperature of gas admitted to one of the stages of said compressor from another stage thereof.

4. A method of controlling surge in a gas compression system as defined in claim 1 including the steps of providing a set point gas discharge pressure, controlling the operation of said system to provide said set point pressure; and reducing the discharge set point pressure of the gas compression system following the detection of a rate of change of inlet gas condition of said predetermined magnitude.

5. A method of controlling surge in a gas compression system as defined in claim 4 wherein said system includes a dump valve for controlling the outlet gas pressure of said system, including the step of opening said dump valve upon detecting another rate of change of inlet gas condition of said predetermined magnitude after the discharge pressure set point of said system has been reset due to the occurrence of a previous excessive rate of change of sensed inlet gas condition, and maintaining said dump valve open to prevent the reoccurrence of another surge condition.

6. A method of controlling surge in a gas compression system as defined in claim 1 wherein said system includes a dump valve for controlling the outlet gas pressure of said system by discharging compressed gas from said system, and said method includes the step of changing the condition of operation of said system by temporarily opening said dump valve to discharge compressed gas upon detecting of a rate of change in said inlet gas condition of said predetermined magnitude.

7. A method of controlling surge in a gas compression system as defined in claim 6 wherein said system includes a gas inlet valve controlling flow of gas to said compressor, inlet valve positioning means, and dump valve positioning means, including the further steps of clamping said gas inlet valve positioning means, and clamping said dump valve positioning means to prevent further closing of said inlet gas valve and said dump valve after detecting a rate of change of inlet gas condition of said predetermined magnitude, thereby reducing the likelihood of a reoccurrence of a surge condition during opening of said dump valve.

8. A method of controlling surge in a gas compression system as defined in claim 6 including the step of fully opening said dump valve upon detecting a rate of change of inlet gas condition of said predetermined magnitude and automatically reclosing said dump valve to its normal operating position subsequent to fully opening thereof.

9. A method of controlling surge in a gas compression system as defined in claim 1 wherein said system includes a dump valve for controlling the outlet gas pressure of said system by discharging compressed gas from said system and a main control system for maintaining a predetermined discharge gas set point pressure from said system, and said method includes the steps of controlling the dump valve to maintain said set point gas discharge pressure; changing the condition of operation of said system by opening said dump valve to discharge gas from said system upon detecting the occurrence of a rate of change of inlet gas condition of said predetermined magnitude; resetting the discharge gas set point pressure of said system to a lower pressure, and restoring control of said dump valve to said main control system so as to control said dump valve to maintain the reset discharge gas set point pressure after the occurrence of said rate of change of inlet gas condition of said predetermined magnitude; and reopening said dump valve and holding said dump valve reopened upon detecting of another rate of change in inlet gas condition of said predetermined magnitude.

10. A gas compression system comprising a gas compressor having an inlet passage to admit gas to said compressor and an outlet passage to discharge compressed discharge gas from said compressor; and a control system for regulating the operation of said system including a surge control comprising:
(A) gas condition sensing means to sense a condition of inlet gas admitted to a portion of said compressor and to provide a gas condition signal which is a function of the sensed inlet gas condition;
(B) differentiating means to differentiate said gas condition signal to provide a differentiated gas condition signal which is a function of the instantaneous rate of change of the sensed condition of said inlet gas;
(C) detector means to detect the instantaneous level of said differentiated gas condition signal and to provide a surge control signal when said differentiated gas condition signal exceeds a predetermined level indicative of the existence of a surge condition; and
(D) control means to adjust the condition of operation of said gas compression system in response to the occurrence of said surge control signal so as to change the condition of operation of said gas compression system in a manner to reduce the tendency for surge to reoccur in said system.

11. A gas compression system as defined in claim 10 wherein said gas condition sensing means is a temperature sensor which is located to sense the temperature of gas admitted to a portion of said compressor.

12. A gas compression system as defined in claim 10 wherein said compressor comprises a multistage compressor and said gas condition sensing means comprises a temperature sensor disposed at a location so as to respond to the temperature of gas admitted to a stage of said compressor subsequent to the first gas compression stage thereof.

13. A gas compression system as defined in claim 10 including a dump valve to regulate the discharge gas pressure of said system by discharging excess compressed gas from the system upon opening thereof, and means to temporarily open said dump valve in response to the occurrence of said surge control signal.

14. A gas compression system as defined in claim 13 including clamp means to prevent closing of said dump valve upon the occurrence of a surge control signal.

15. A gas compression system as defined in claim 10 including an inlet gas valve for controlling admission of gas to said compressor; main system control means to control the opening and closing of said inlet gas valve in response to the sensed condition of gas admitted to said compressor; and clamp means to prevent closing of said inlet gas valve upon the occurrence of a surge control signal.

16. A gas compression system as defined in claim 10 including:
(A) sensing means to sense the condition of the inlet gas admitted to said gas compressor;
(B) a dump valve to regulate the discharge pressure of said system in response to said inlet gas conditions by exhausting compressed gas from said system to maintain a predetermined set point discharge pressure;
(C) main system control means to regulate the opening and closing of said dump valve in response to the sensed inlet gas conditions to maintain said predetermined set point discharge pressure;
(D) means to open said dump valve in response to the existence of said surge control system;
(E) means to reduce said predetermined set point discharge pressure upon the occurrence of a surge control signal; and (F) means to restore operation of said dump valve in response to said main system control means after the occurrence of said surge control signal to thereby maintain said gas compression system in operation at a reduced pressure.

17. A gas compression system as defined in claim 16 including control means to open said dump valve and to maintain said dump valve open upon the occurrence of another surge control signal after a first surge control signal has occurred to thereby prevent the reoccurrence of another surge condition in said system.

18. A gas compression system as defined in claim 10 including:
(A) an inlet gas valve to control the passage of gas admitted to said compressor;
(B) a dump valve to control the pressure of gas discharged from said compressor by discharging gas from said system to maintain a desired compressed outlet gas pressure;
(C) inlet gas condition sensing means to sense the condition of gas admitted to said compressor;
(D) main system control means for adjusting the position of said inlet gas valve and said dump valve to maintain a desired set point outlet gas pressure from said system by opening and closing of said valves in accordance with the desired set point outlet gas pressure and the sensed inlet gas conditions;
(E) inlet valve clamp means for preventing said inlet gas valve from closing upon actuation thereof;
(F) dump valve clamp means for preventing said dump valve from closing upon actuation thereof;
(G) override circuit means for energizing said inlet valve clamp means and said dump valve clamp means, and for temporarily overriding said main system control means and opening said dump valve upon a first occurrence of surge control signal;
(H) set back circuit means for resetting the set point outlet gas pressure maintained by said main system control means after said first occurrence of a surge control signal;
(I) means for automatically deactuating said override circuit means after the occurrence of said first surge control signal, to thereby unclamp said inlet gas valve closing function and said dump valve closing function, and to deenergize said override circuit means to restore control of said valve to said main system control means, so that said system provides compressed gas at a lower set point pressure after the occurrence of said first surge control signal; and
(J) second override control circuit means to open said dump valve and maintain said dump valve open upon the occurrence of another surge control signal subsequent to the occurrence of the first surge control signal to prevent the reoccurrence of a surge condition in said system.

References Cited

UNITED STATES PATENTS

| | | | |
|---|---|---|---|
| 2,632,307 | 3/1953 | Massey et al. | 230—114 X |
| 2,696,345 | 12/1954 | Hopper | 230—115 |
| 2,929,547 | 3/1960 | Koffel | 230—115 |
| 2,938,536 | 5/1960 | Ehrenberg | 103—11 X |
| 2,955,745 | 10/1960 | Hunter | 230—115 |
| 3,007,414 | 11/1961 | Long et al. | 230—115 X |
| 3,027,904 | 4/1962 | Silver | 230—115 X |
| 3,068,796 | 12/1962 | Pfluger et al. | 103—11 X |
| 3,332,605 | 7/1967 | Huesgen | 230—115 |

WILLIAM L. FREEH, *Primary Examiner.*

U.S. Cl. X.R.

230—45